United States Patent [19]

Siegenthaler

[11] Patent Number: 5,186,951
[45] Date of Patent: Feb. 16, 1993

[54] CURING DEVICE FOR TIRES

[75] Inventor: Karl J. Siegenthaler, Rome, Italy

[73] Assignee: Bridgestone/Firestone, Inc., Akron, Ohio

[21] Appl. No.: 725,868

[22] Filed: Jul. 3, 1991

[30] Foreign Application Priority Data

Jul. 17, 1990 [IT] Italy ............................ 67555 A/90

[51] Int. Cl.⁵ ............................................ B29C 35/02
[52] U.S. Cl. ................................... 425/28.1; 425/40; 425/41; 425/44; 425/50; 425/DIG. 13
[58] Field of Search .................... 425/28.1, 40, 41, 44, 425/50, DIG. 13

[56] References Cited

U.S. PATENT DOCUMENTS 4,747,765  5/1988  Siegenthaler ...................... 425/28.1
5,020,982  6/1991  Kubota et al. ......................... 425/50

Primary Examiner—Willard Hoag
Attorney, Agent, or Firm—Ernst H. Ruf

[57] ABSTRACT

A tire curing device wherein an upper half mold and a lower half mold define a toroidal chamber for accommodating a tire to be cured and constituting a portion of a closed circuit for a batch charge of a heat exchange fluid, the tire being cured by circulating the fluid along the circuit by means of an impeller device; the fluid being heated by a heating device as it flows along a return conduit having an annular section increasing towards the impeller device and coaxial and aligned with the annular inlet of the same; the fluid being fed to the toroidal chamber along a delivery conduit having an annular section and so shaped as to exert at least on compression-expansion action on the fluid.

10 Claims, 2 Drawing Sheets

20
CURING DEVICE FOR TIRES

TECHNICAL FIELD

The present invention relates to a tire curing device.

BACKGROUND OF THE ART

In particular, the present invention relates to a curing device for tires comprising an upper half mold and a lower half mold connectable in releasable manner and defining a toroidal chamber for accommodating a tire to be cured and constituting part of a closed circuit for a batch charge of a heat exchange fluid; the circuit also comprising a delivery and a return conduit for the heat exchange fluid, connected to the toroidal chamber, and being assigned both powered means for force circulating the heat exchange fluid along the closed circuit, and heating means for heating the exchange fluid. A prior art curing device of the above type is described in U.S. Pat. No. 4,747,765, the content of which is fully incorporated herein by reference.

The curing device described in the noted patent comprises a central unit connected to the two half molds and housing both the forced circulating and heating means. The central unit is also designed in such a manner as to define both the delivery and return conduits for the heat exchange fluid. In the noted prior art curing device, the heating means consist of a heating element comprising a block of sintered material mounted inside the central unit and fitted through with a number of parallel, substantially axial channels defining part of the closed circuit and along which the heat exchange fluid flows from the toroidal chamber. Each channel houses an incandescent electrical resistor lapped directly by the heat exchange fluid, which is thus heated to the temperature required for curing a green tire housed inside the toroidal chamber.

In actual use, the heating element used in the aforementioned central unit has been found to result in relatively high hydraulic resistance capable of seriously decelerating the flow of the heat exchange fluid from the toroidal chamber. Moreover, immediately upstream from the inlet to the forced circulating means, the heating element creates such a swirl as to seriously impair the efficiency of the circulating means and, consequently, the acceleration imparted by the same to the heat exchange fluid. This swirl is transmitted downstream from the forced circulating means, thus resulting in further deceleration of the heat exchange fluid along the delivery conduit.

In the noted prior art curing device, the circulating means comprise a powered impeller, which, in addition to accelerating the heat exchange fluid, also provides for feeding it in a helical direction along the delivery conduit, so that it enters the toroidal chamber at a speed having a relatively high transverse component, i.e. directed circumferentially in relation to the toroidal chamber. The heat exchange efficiency of the heat exchange fluid and the green tire inside the toroidal chamber has in fact been found to be proportional to the speed at which the heat exchange fluid is circulated along the toroidal chamber and, therefore, to the transverse component of the speed at which the heat exchange fluid flows along the delivery conduit.

The main drawback caused by deceleration of the heat exchange fluid from the toroidal chamber, due to the type of heating device employed, by the poor efficiency of the circulating means, and by the resulting overpressure generated inside the delivery conduit, is that the speed at which the heat exchange fluid is fed along the delivery conduit presents a relatively low transverse component, thus resulting in a disturbed, substantially axial stream of heat exchange fluid along the delivery conduit.

SUMMARY OF THE INVENTION

The aim of the present invention is to provide a tire curing device of the aforementioned type designed to overcome the aforementioned drawbacks, by providing for a stream of heat exchange fluid along the delivery conduit having a relatively high transverse component. With this aim in view, according to the present invention, there is provided a curing device for tires comprising an upper half mold and a lower half mold; a toroidal chamber for accommodating a tire to be cured and defined by said half molds; a closed circuit for a batch charge of a heat exchange fluid, said toroidal chamber forming part of said closed circuit; impeller means for force circulating said heat exchange fluid along said closed circuit, said closed circuit comprising a delivery conduit and a return conduit for said heat exchange fluid connected to said toroidal chamber; and heating means located along said return conduit, for heating said heat exchange fluid to a predetermined temperature; characterized by the fact that said return conduit is an annular section conduit defined internally by said heating means, and having an annular outlet end; said impeller means having an annular inlet end coaxial and aligned with said outlet end; said return conduit presenting a section increasing towards said annular outlet end and such as to enable expansion of said heat exchange fluid during heating; and guide means being provided along said return conduit for guiding said heat exchange fluid in an axial direction in relation to said impeller means. The delivery conduit is preferably an annular section conduit coaxial with the return conduit.

In the curing device for tires, as described above, the annular section of the return conduit, alignment of the return conduit with the inlet of the impeller means, and provision of said guide means for minimizing swirl in the stream of heat exchange fluid entering the impeller means, provide for a high degree of operating efficiency. Moreover, to prevent any deceleration in the flow of heat exchange fluid along the delivery conduit and, consequently, a reduction in said transverse speed component, the delivery conduit preferably houses the impeller means, and presents a section varying in such a manner as to exert on the heat exchange fluid at least one compression-expansion action, said at least one expansion action being exerted, in use, downstream from the impeller means.

Thus, the heat exchange fluid, subsequent to expansion at the outlet of said impeller means, is subjected to substantially no braking action as it flows along the delivery duct, and preserves, along the same, the rotary movement originally imparted by the impeller means. The heat exchange fluid therefore flows helically along the delivery conduit, thus resulting, inside the toroidal chamber, in high-speed circumferential flow of the heat exchange fluid in relation to the chamber itself.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
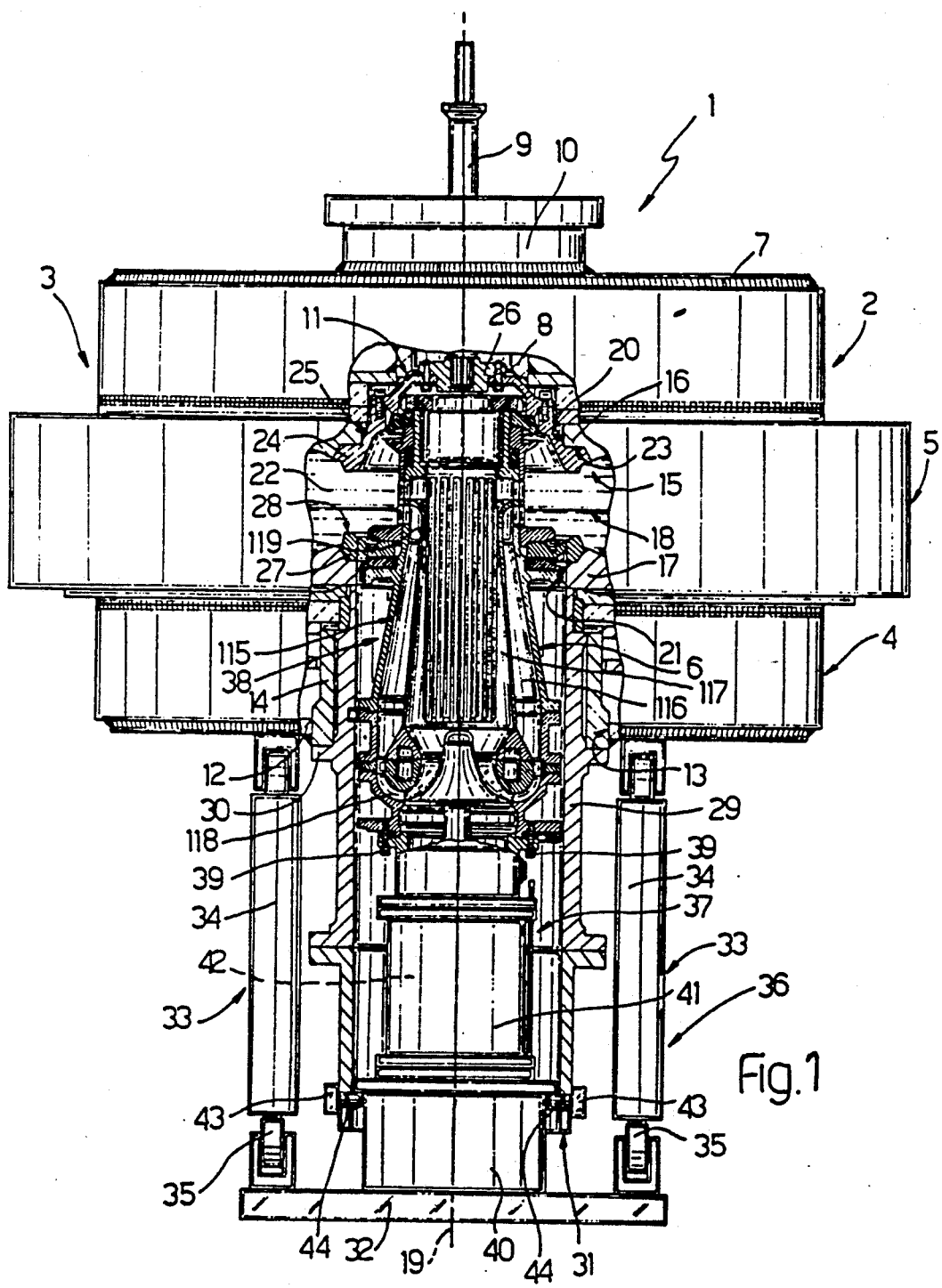
FIG. 1 shows a side view and partial axial section of a preferred embodiment of the curing device according to the present invention.

Number 1 in FIG. 1 indicates a curing device constituting an improvement over that described and illustrated in U.S. Pat. No. 4,747,765, the content of which is fully incorporated herein by reference. Curing device 1 comprises a substantially cylindrical casing 2 defined by an upper half casing 3 and a lower half casing 4 connected in a releasable manner by a bayonet connector 5, and fitted through with a coaxial vertical central unit 6 as shown in detail in FIG. 2. Upper half casing 3 is substantially cup-shaped, and comprises a flat top wall 7 fitted through with a cylindrical tubular body 8 engaged by a shaft 9, the upper portion of which protrudes from half casing 3 through an externally flanged tubular body 10 enabling connection of half casing 3 to a known lifting device (not shown).

At the top, shaft 9 is connectable in known manner to a known actuating device for axially displacing shaft 9, and constitutes the upper element of an extracting device 11 to be described in more detail later. Lower half casing 4 is also substantially cup-shaped, and comprises a bottom wall 12 having a central through hole 13 coaxial with half casing 4 and engaged by the bottom end of a tubular body 14. Casing 2 houses a toroidal curing mold 15 defined by an upper half mold 16 and a lower half mold 17 contacting each other along a surface 18 perpendicular to axis 19 of casing 2.

Half molds 16 and 17 present respective central through holes 20 and 21 coaxial with each other and with axis 19, and define a toroidal chamber 22 for accommodating a green tire to be cured (not shown). Surface 18 divides chamber 22 into two parts, and is located below the horizontal plane of symmetry so that the portion of chamber 22 defined by upper half mold 16 is slightly larger than that defined by lower half mold 17.

The lower inner periphery of upper half mold 16 presents a groove 23 housing an outer ring 24 on extracting device 11, which substantially consists of an upward-tapered bell 25 fitted on the bottom end with ring 24, extending upwardly through hole 20, and closed at the top by a disk 26 connected in a releasable manner to the bottom end of shaft 9. Bell 25 is so shaped that, when shaft 9 is pushed down in relation to upper half mold 16, the whole of bell 25 moves down, and ring 24 provides, during curing, support for the upper bead portion (not shown) of the tire (not shown) being cured. Similarly, the upper inner periphery of lower half mold 17 presents a fixed ring 27 which, together with ring 24, defines an inner annular opening 28 for access to chamber 22, and provides support for the lower bead portion (not shown) of the tire (not shown) being cured. Tubular body 14 is engaged by the upper portion of a tubular body 29 having an intermediate flange 30 connected integrally with the bottom end of tubular body 14. Tubular body 29 extends vertically downwardly and outwardly of tubular body 14, and presents a bottom edge 31 facing a flat plate 32 designed to move to and from wall 12 in the direction of axis 19 by virtue of a number of vertical jacks 33, each comprising a body 34 anchored to wall 12, and an output member 35 anchored to plate 32.

Central unit 6 is housed inside a compartment defined by tubular body 29 and half molds 16 and 17 between plate 32 and disk 26, and is designed to move in relation to casing 2 by virtue of a device 36 defined by plate 32 and jacks 33. In other words, if casing 2 is mounted in a fixed position on a support (not shown), activation of device 36 provides for moving unit 6 axially between the operating position shown in FIG. 1 and a bottom extracted position. Alternatively, if plate 32 is integral with a support (not shown), activation of device 36 provides for moving the whole of casing 2 in relation to unit 6 in such a manner as to move unit 6 axially in relation to casing 2 between said operating and extracted positions.

As shown in FIG. 1, central unit 6 is elongated in shape, extends coaxially with casing 2, and comprises a lower portion 37 and an upper portion 38 connected together by means of a number of screws 39. Lower portion 37 comprises a first tubular body 40, the bottom end of which is located in contact with plate 32 in the operating position, and the top end of which is integral with a body 41 constituting the outer casing of a motor 42. Body 40 is fitted with a number of radial outer screws 43 engaging respective axial slots 44 extending upwards from bottom edge 31 of tubular body 20 and which, when tightened, provide for locking central unit 6 in relation to tubular body 29.

Figure 2:
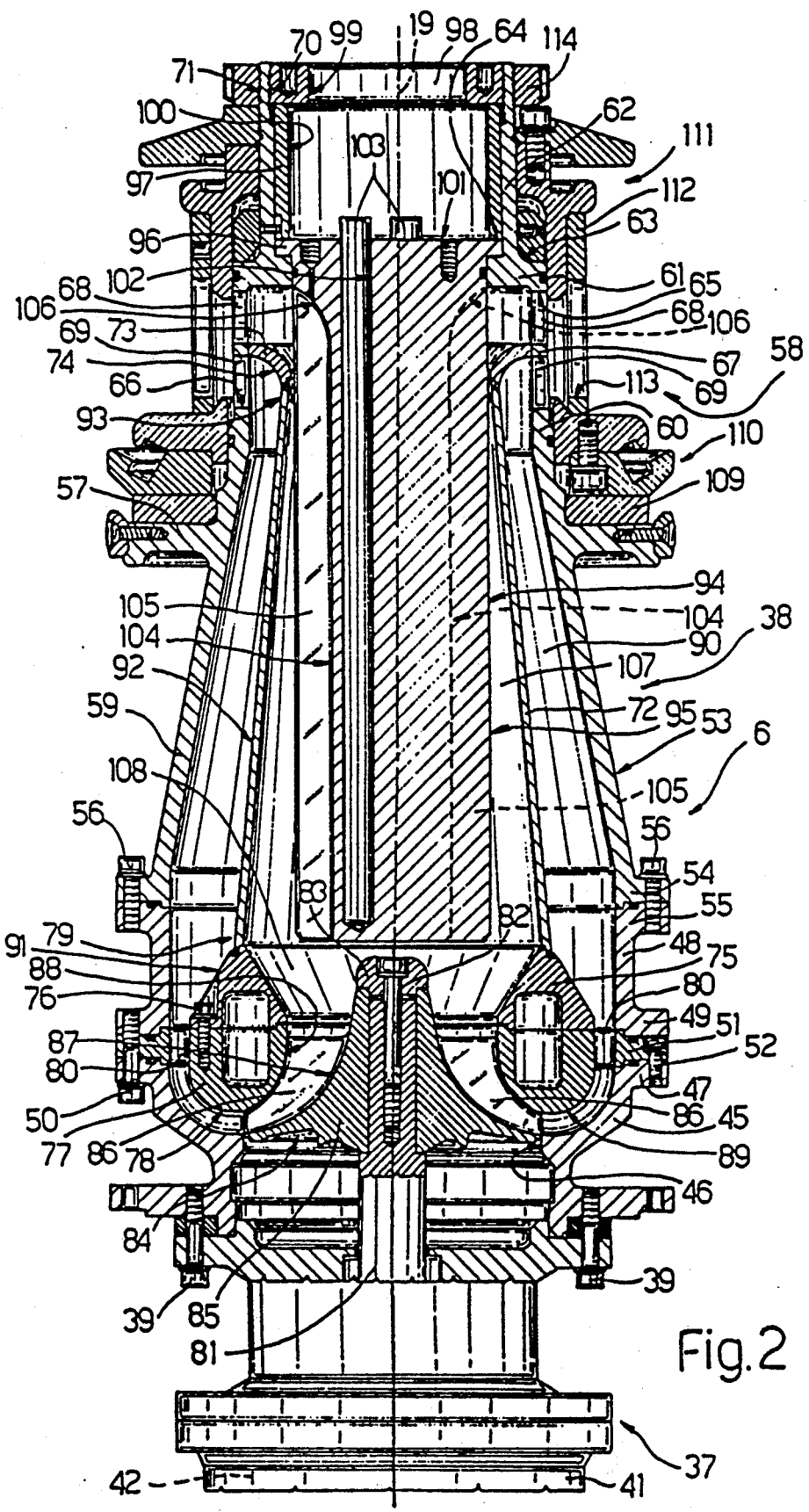
FIG. 2 shows a larger-scale view of a detail in FIG. 1.

As shown in FIG. 2, upper portion 38 of unit 6 comprises a hollow lower body 45 having an axial through hole 46 and an upper flange 47; an intermediate tubular body 48 having a lower flange 49 connected to flange 47 by means of screws 50 and via the interposition of a ring 51 connected to flange 47 by means of screws 52; and an upper tubular body 53, a lower flange 54 of which is connected to upper flange 55 of intermediate body 48 by means of screws 56, and an intermediate outer flange 57 of which supports an adjustable coupling device 58 for a substantially C-section bladder (not shown) designed, in use, to occupy the internal volume of a tire housed inside chamber 22.

Upper tubular body 53 comprises a lower truncated-cone tubular portion 59 tapering upwardly from flange 54; an intermediate cylindrical tubular portion 60 located over flange 57 and having, on its top end, an inner annular flange 61; and an upper cylindrical tubular portion 62 coaxial and integral with portions 59 and 60, and extending upwardly from the intermediate portion of flange 61 so as to define, on the upper surface of flange 61, an outer shoulder 63 and an inner shoulder 64.

Through intermediate portion 60, there are formed two superimposed rings of openings 65 and 66, the former located over the latter, and both combining to define a continuous ring 67 from which extend upwardly and downwardly two series of axial columns 68 and 69 respectively separating openings 65 and 66. An internal thread 70 and external thread 71 are formed on the top end portion of upper portion 62.

Tubular body 53 is fitted inside with a coaxial truncated-cone tubular body 72 having its wider end facing downwards. The taper ratio of tubular body 72 is less than that of lower tubular portion 59 of tubular body 53, and the narrower top end is fitted with a curved external flange 73, a peripheral annular surface of which contacts the inner surface of ring 67, and the lower surface 74 of which presents a section substantially in the form of an arc of a circle, and blends with the narrower end of tubular body 72.

The wider end of tubular body 72 is fitted with a ring 75 having an axial half-section substantially in the form of an isosceles triangle with its base facing downwardly and substantially coplanar with the lower surface of flange 49 of intermediate body 48. The base of ring 75 is secured, by screws 76, contacting the upper flat annular surface of a ring 77 housed inside lower body 45 and defined laterally and at the bottom by a surface 78 having a substantially U-shaped axial half-section.

Tubular body 72 and rings 75 and 77 integral with same constitute a tubular assembly 79 coaxial with axis 19, located inside portion 38, and supported by portion 38 via a number of arms 80 extending radially outwardly from surface 78 of ring 77 and integral with the inner periphery of ring 51. Electric motor 42 presents, at the top, an output shaft 81 extending coaxially with axis 19 through rings 75 and 77, and is fitted, at the top end via screw 82, with a head or cap 83 for axially locking an impeller 84 comprising an upwardly-tapered central body 85 fitted on shaft 81, and a number of blades 86 extending outwardly from central body 85.

Central body 85 is arranged with its wider end inside hole 46, and is defined externally by a surface 87 having a substantially parabolic axial half-section with its axis parallel to axis 19, and defining, with an inner portion of surface 78 of ring 77, a curved annular channel 88, the section of which decreases gradually downwardly and blends, at the bottom With the bottom end of a curved channel 89 having a substantially constant section and defined between an outer portion of surface 78 and the inner surface of body 45.

Channel 88 is swept by blades 86 over the inner portion of surface 78, While channel 89 communicates at the top, through openings defined by adjacent pairs of arms 80, with the bottom end of an annular-section conduit 90 defined between assembly 79 on one side, and intermediate body 48 and lower portion 59 on the other, and communicating at the top with openings 66. Conduit 90 presents a lower portion 91 of upwardly-increasing section; an intermediate portion 92 of upwardly-decreasing section; and a curved upper portion 93 communicating with openings 66 and increasing in section towards same.

Portion 38 of unit 6 houses a substantially cylindrical heating unit 94 coaxial with axis 19 and having an outer surface 95 of substantially the same diameter as the inside diameter of flange 61 and the narrower end of tubular body 72. Unit 94 extends through flange 61 and tubular body 72 with its lower surface facing head 83, and presents an upper annular flange 96 supported on inner shoulder 64 and locked contacting same by a tubular spacer 97 fitted in sliding manner inside upper portion 62 and secured axially by an annular ring nut 98 mating with thread 70 and defining a central hole 99 enabling access to a cavity 100 defined laterally by the inner surface of spacer 97 and at the bottom by the flat upper surface 101 of unit 94. Through surface 101, there are ®formed a number of axial blind holes 102, each housing a shielded resistor 103 connected to an electric circuit (not shown) and removable manually through cavity 100 and hole 99 for maintenance and/or replacement.

Milled in surface 95 there are a number of axial grooves 104 defining radial heat exchange fins 105, each terminating at the top in a curved portion constituting one end of a curved channel 106 extending between the facing surfaces of flanges 61 and 73 and through a respective opening 66. The bottom ends of channels 106 all communicate with the top end of an annular conduit 107 defined between unit 94 and tubular body 72, and having a downwardly-increasing section. Along conduit 107, fins 105 constitute directional members for a stream of heat exchange fluid flowing along conduit 107. The bottom end of conduit 107 communicates with the end of an annular channel 108 having a downwardly-decreasing section, surrounding head 83, and connected to channel 88, the top end of which is arranged directly facing the open bottom end of grooves 104.

Coupling device 58 comprises a base washer 109 supported on flange 57 and selectable from a series of washers of the same diameter but varying in thickness within a given range. Coupling device 58 also comprises a first and second known annular grip device, 110 and 111, for respectively gripping the lower and upper edges of a curing bladder (if any) (not shown). Grip devices 110 and 111 are connected in an axially sliding manner to the outer surfaces of respective tubular portions 59 and 62, and are separated by a tubular spacer 112 selectable from a series of spacers of the same diameter but varying in length within a given range, and having a ring of openings 113, each aligned with a respective pair of superimposed openings 65 and 66. Washer 109, grip devices 110 and 111 and spacer 112 are packed against flange 57 by a ring nut 114 mating with thread 71 on upper portion 62.

With reference to FIG. 1, and as described and shown in FIG. 2, in the operating position through mold 15, upper portion 38 of central unit 6 defines a circuit 115 for a heat exchange fluid; said circuit 115 comprising toroidal chamber 22; a delivery conduit 116 for supplying said fluid to chamber 22 and defined (FIG. 2) by channels 108, 88, 89 and 90 and openings 66 and 113; and a return and heating conduit 117 defined (FIG. 2) by openings 113 and 65, channel 106 and conduit 107.

As described and shown in FIG. 2, return conduit 117 (FIG. 1) defines a Venturi tube, the narrow section portion of which corresponds with the point at which flange 73 is connected to the top end of tubular body 72, i.e. close to the point at which the heat exchange fluid contacts the central core of heating unit 94.

As described and shown in FIGS.1 and 2, delivery conduit 116 defines a first Venturi tube 118 comprising channels 88 and 89 and lower portion 91 of channel 90; and a second Venturi tube 119 arranged in series in relation to tube 118 and comprising intermediate portion 92 and upper portion 93 of channel 90.

For reasons to be explained later, it should also be noted that columns 68 act as swirl dividing or initiating devices for the heat exchange fluid supplied to toroidal chamber 22 by delivery conduit 116; while fins 105 extending along return conduit 117 act as directional flow equalizers for the heat exchange fluid supplied to impeller 84, i.e. for eliminating swirl in the return flow and breaking it down into equal, substantially parallel treads or channels parallel to axis 19 of impeller 84.

Operation of curing device 1 will be described commencing from the operating position (not shown) wherein extracting device 11 and half casing 3, formerly maintained in the raised position by a device not shown, are moved successively towards half casing 4, after first inserting, inside the portion of chamber 22 defined by half mold 17, the lower portion of a green tire (not shown) arranged with the lower bead contacting fixed ring 27.

If a curing bladder (not shown) is provided and supported on grip devices 110 and 111, this is inserted inside the green tire (not shown) by injecting a relatively low-pressure charge of heat exchange fluid inside circuit 115 through an inlet valve (not shown) preferably mounted through tubular body 29. While in no way detracting from the general scope of the following description, this will refer to direct curing of the tire, assuming no bladder is employed.

When extracting device 11 is moved, by an actuating device (not shown) connected to shaft 9, in relation to upper half casing 3 and towards lower half casing 4, ring 24 on extracting device 11 is moved into the operating position contacting the upper bead area (not shown) of the green tire (not shown). If a bladder is employed, the green tire is compressed axially via said bladder into the final curing shape, whereas, in the absence of said bladder, it is fed, only at this point, with said relatively low-pressure charge of heat exchange fluid.

Half casings 3 and 4 are then brought together and connected firmly in a fluid-tight manner by means of connector 5, and a relatively high-pressure batch charge of heat exchange fluid, preferably nitrogen, is fed into circuit 115 through the inlet valve (not shown) and along circuit 115 to impeller 84. In particular, the heat exchange fluid is fed to chamber 22 along delivery conduit 116 and back to impeller 84 along return conduit 117, said fluid being heated in contact with heating unit 94 prior to reaching impeller 84.

At this point, device 1 is connected solely to an external source of electric energy, which provides for powering motor 42, heating unit 94 and the resistors (not shown) inside mold 15, and for circulating the pressurized heat exchange fluid, heated to a given temperature, along circuit 115 for as long as necessary for curing the green tire.

During the curing process, the heat exchange fluid issuing from toroidal chamber 22 presents a powerful swirl which, despite effectively improving heat exchange inside chamber 22, seriously impairs the efficiency of impeller 84. As the fluid flows along conduit 117, however, this swirl is substantially eliminated by fins 105 which, as already stated, act as directional flow equalizers, that is, for eliminating swirl in the return flow and breaking it down into equal, substantially parallel threads or channels parallel to axis 19 of impeller 84. Moreover, the return flow is accelerated by virtue of being heated in contact with heating unit 94 and expanded by the increasing section of channel 107 in the direction of impeller 84. Finally, the annular section of channel 107 and channel 108, which constitutes the inlet to impeller 84, provides for supplying impeller 84 with a substantially concentric stream of heat exchange fluid. By virtue of the Venturi tube 118 formed through impeller 84, the fluid immediately downstream from impeller 84 is expanded, thus improving the efficiency of impeller 84; further increasing the speed of the fluid along conduit 116; and preserving, in the fluid, the transverse component imparted by impeller 84.

Though not strictly indispensable, the second Venturi tube 119 is useful for first slowing down the fluid, thus enabling it to be further heated by compression and by flowing upstream in contact with the outer surface of tubular body 72, and for subsequently accelerating it through openings 66, the columns 69 of which provide for breaking the flow and inducing in the fluid a relatively strong swirl for improving heat exchange inside chamber 22.

Once the tire is cured, the heat exchange fluid is drained from circuit 115, and device 1 opened by releasing connector 5 and separating half casings 3 and 4, subsequent to which, the finished tire (not shown) inside chamber 22 is detached from lower half mold 17, due to the asymmetrical position of contact surface 18 of half molds 16 and 17, and remains attached to upper half mold 16 from which it is detached by extracting device 11 being moved down by said actuating device (not shown).

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A tire curing device including an upper half mold and a lower half mold; a toroidal chamber for accommodating a tire to be cured and defined by said half molds; a closed circuit for a batch charge of a heat exchange fluid, said toroidal chamber forming part of said closed circuit; impeller means for force circulating said heat exchange fluid along said closed circuit, said closed circuit including a delivery conduit and a return conduit for said heat exchange fluid, connected to said toroidal chamber; and heating means located along said return conduit, for heating said heat exchange fluid to a predetermined temperature; said return conduit being an annular section conduit defined internally by said heating means, and having an annular outlet end; said impeller means having an annular inlet end coaxial and aligned with said outlet end; said return conduit presenting a section increasing toward said annular outlet end such as to enable expansion of said heat exchange fluid during heating; and radially extending guide means along said return conduit for guiding said heat exchange fluid in an axial direction in relation to said impeller means.

2. A device as claimed in claim 1 in which said delivery conduit is an annular section conduit coaxial with said return conduit.

3. A device as claimed in claim 2 comprising flow dividing means between said toroidal chamber and said delivery conduit, for initiating a swirl in said heat exchange fluid entering said toroidal chamber.

4. A device as claimed in claim 3 in which said delivery conduit communicates with said toroidal chamber through a ring of openings; said dividing means consisting of columns separating said openings.

5. A device as claimed in claim 4 in which said delivery conduit houses said impeller means, and presents a section varying in a manner so as to exert on said heat exchange fluid at least one compression-expansion action, said at least one expansion action being exerted, in use, downstream from said impeller means.

6. A device as claimed in claim 5 in which said heating means comprises a substantially cylindrical heating unit coaxial with said impeller means; said guide means consisting of axial fins extending radially outwards from said heating unit.

7. A device as claimed in claim 6 comprising an outer tubular body and an inner tubular body coaxial with each other and of substantially truncated-cone shape; said heating means being coaxial with said two tubular bodies, being substantially cylindrical in shape, being housed inside said inner tubular body so as to define, with the same, said return conduit, and having external radiating means constituting said guide means; said two tubular bodies combining to define said delivery conduit.

8. A device as claimed in claim 7 in which said inner tubular body is fitted with an annular body on its wider end; said impeller means being arranged centrally in relation to said annular body and defining, with the same and with said outer tubular body, a U-shaped conduit forming the inlet portion of said delivery conduit and connecting said return and delivery conduits.

9. A device as claimed in claim 8 in which said U-shaped conduit is a Venturi tube.

10. A device as claimed in claim 9 in which said delivery conduit is so shaped so as to define a further Venturi tube arranged in series in relation to the other said Venturi tube and downstream from said in the flow direction of said fluid towards said toroidal chamber.

* * * * *